UNITED STATES PATENT OFFICE.

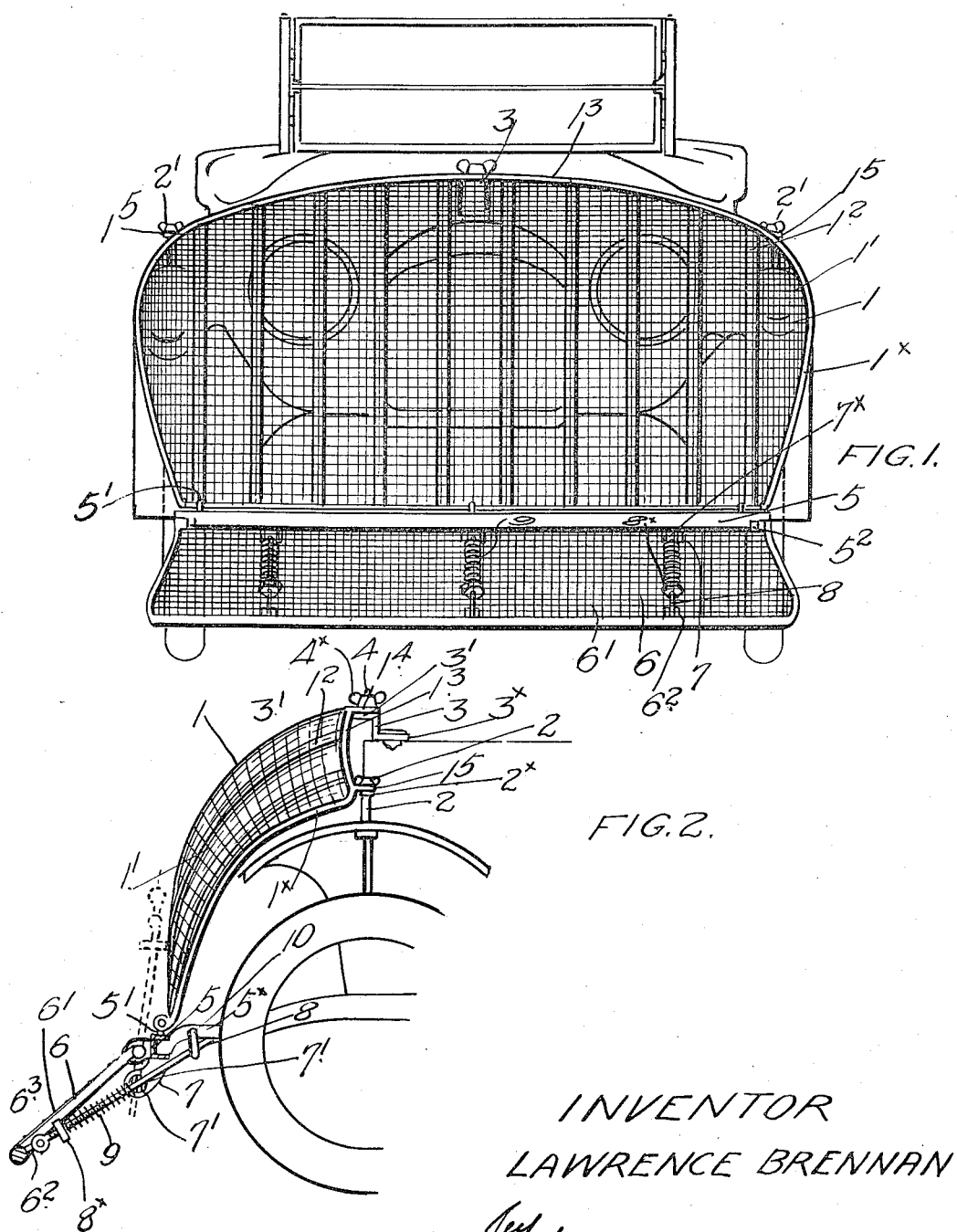

LAWRENCE BRENNAN, OF RED DEER, ALBERTA, CANADA.

FENDER FOR AUTOMOBILES.

1,290,705. Specification of Letters Patent. Patented Jan. 7, 1919.

Application filed September 13, 1918. Serial No. 253,959.

*To all whom it may concern:*

Be it known that I, LAWRENCE BRENNAN, of the town of Red Deer, in the Province of Alberta, Canada, have invented certain new and useful Improvements in Fenders for Automobiles, of which the following is the specification.

My invention relates to improvements in fenders for automobiles and the object of the invention is to devise a simple construction of fender which will be light and capable of being rigidly secured to an automobile and in which the lower portion thereof may be readily adjusted so as to be carried in a lowered position when the automobile is used in a city and in a raised position when the car is passing over rough surface such as country roads and it consists essentially of the following arrangement and construction of parts as hereinafter more particularly explained.

Figure 1 is a front elevation of my fender showing it attached to an automobile.

Fig. 2, is a side view of the front portion of an automobile showing my fender attached, the lower portion of the fender and fender bar being shown in section.

In the drawings like characters of reference indicate corresponding parts in the various figures.

1 indicates the upper portion of the fender comprising a frame $1^x$, the upper portion of which is curved so as to extend over the front portion of the mud guards and over the front portion of the engine housing. $1'$ indicates a filling of wire mesh carried by the frame $1^x$, the wire mesh being held out in curved form by means of spring bands $1^2$ extending from the top to the bottom of the frame $1^x$. The upper bar portion $1^3$ of the frame $1^x$ is provided with a central lug $1^4$ and side lugs $1^5$. The ordinary bolt by which the front mud guard is attached to the mud guard supporting bracket is provided with an upward extension 2, which is provided with a shoulder $2^x$ intermediately of its height. The upper portion of the bolt extension 2 is threaded to receive a wing nut $2'$. By this means the sides of the top of the fender are secured in position. The center portion of the fender is secured in position by means of a bracket 3, the lower portion $3^x$ of which extends around the filling orifice of the radiator of the car, and the upper portion $3'$ of which is bent outwardly beneath the lug $1^4$ and is secured thereto by means of a bolt 4 and wing nut $4^x$.

5 indicates the ordinary fender bar of the car which is carried in the usual manner by arms $5^x$. $5'$ indicate bolts connecting the lower bar of the upper fender portion 1 to the fender bar 5. 6 indicates the lower fender portion which is swung upon lugs $5^2$ forming part of the fender bar 5.

7 indicate arms extending down from the fender bar 5 between which is carried a turnable pin $7^x$ having a diametric orifice $7'$. $6'$ indicates wire mesh covering the frame of the lower fender 6. $6^2$ indicate lugs extending from the lower bar $6^3$ of the lower fender 6. Between the lugs $6^2$ is pivotally mounted an eye bar 8 provided with a threaded portion on which is mounted a nut $8^x$. 9 indicates a spiral spring suitably connected at one end to the nut $8^x$ and at the opposite end to the pin $7^x$. The upper end of the eye bar 8 bears against the lower face of the arm $5^x$ and is held in this position by means of an eye ring 10, which is swung beneath the upper end of the bar 8.

In the position shown in the drawing the lower fender is adaptable for use in a city where there is a large amount of traffic. When, however, the automobile is passing over rough country roads where it would be undesirable to use the lower fender the eye ring 10 is swung up so as to free the rod 8 and the lower fender portion 6 is swung up into the dotted position shown in Fig. 2, thereby carrying the spring 9 from a compressing position or the normal position as shown in Fig. 2 to a tension position.

It will be noted that as the lower fender portion is swung up to the dotted position that the pull of the spring 9 is carried into a position back of the center of swing of the fender portion 6 and, therefore, the tendency of such spring is to draw the fender portion 6 against the upper fender portion 1.

From this description it will be seen that I have devised a very simple form of fender which may be readily adaptable for use for automobiles which may be light and durable and which will be easily adapted for use for both city and country roads.

What I claim as my invention is.

1. A fender for automobiles comprising an upper fender portion carried in a stationary position upon the fender bar and front portion of the car, and a lower fender portion swingably attached to the fender bar, and resilient means for holding such fender portion in the lowered or raised position.

2. A fender for automobiles comprising a stationary fender portion carried by the fender bar and front portion of the automobile, a lower fender portion swingably carried by the fender bar, and resilient means held in compression to hold the lower fender portion in the lowered position and held in tension at the back of the center of swing of the lower fender portion when such fender portion is in the raised position.

3. In a fender for automobiles, the combination with the fender bar of an automobile, of a fender portion swingably carried by the fender bar extending normally downward in an inclined position therefrom, and resilient means held in compression for holding the fender in the downwardly inclined position and held in tension when the fender bar is swung up to its raised position to carry the tension spring to the rear of the center of swing of the fender portion.

4. In a fender for automobiles, the combination with the fender bar and supporting arms thereof, of a fender portion swingably carried by the fender bar and extending downwardly in an inclined direction therefrom, carrying members carried by the fender bar, a turnable pin rotatably carried in the carrying members and having a diametric orifice, a rod extending through such diametric orifice and pivotally connected at its lower end to the lower portion of the fender and bearing at its upper end against the fender bar supporting arm, an abutment carried by the rod, and a spring secured to such abutment and the turnable pin.

5. In a fender for automobiles, the combination with the fender bar and supporting arms thereof, of a fender portion swingably carried by the fender bar and extending downwardly in an inclined direction therefrom, carrying members carried by the fender bar, a turnable pin rotatably carried in the carrying members and having a diametric orifice, a rod extending through such diametric orifice and pivotally connected at its lower end to the lower portion of the fender and bearing at its upper end against the fender bar supporting arm, an abutment carried by the rod, a spring secured to such abutment and the turnable pin, and a ring swung upon the fender bar supporting arm and adapted to be swung beneath the upper end of the rod.

6. In a fender for automobiles, the combination with the fender bar and supporting arms thereof, of a fender portion swingably carried by the fender bar and extending downwardly in an inclined direction therefrom, carrying members carried by the fender bar, a turnable pin rotatably carried in the carrying members and having a diametric orifice, a rod extending through such diametric orifice and pivotally connected at its lower end to the lower portion of the fender and bearing at its upper end against the fender bar supporting arm, an abutment adjustable longitudinally of the rod and a spring secured to such abutment and the turnable pin.

LAWRENCE BRENNAN.

Witnesses:
M. EGAN,
N. CARTER.